United States Patent [19]
Andersson et al.

[11] 3,915,793
[45] Oct. 28, 1975

[54] FUEL ASSEMBLY FOR A BOILING WATER REACTOR

[75] Inventors: Ingmar Andersson; Aart Van Santen, both of Vasteras, Sweden

[73] Assignee: Asea-Atom, Vasteras, Sweden

[22] Filed: June 21, 1973

[21] Appl. No.: 372,188

[30] Foreign Application Priority Data
June 22, 1972 Sweden............................ 8290/72

[52] U.S. Cl. ...................... 176/78; 176/36; 176/61
[51] Int. Cl. ............................................. G21c 3/34
[58] Field of Search .............. 176/78, 61, 50, 56, 36

[56] References Cited
UNITED STATES PATENTS

| | | |
|---|---|---|
| 3,607,639 | 9/1971 | Van Santen et al. ................ 176/78 |
| 3,671,394 | 6/1972 | Bernath et al. ....................... 176/40 |
| 3,713,971 | 1/1973 | Van Santen et al. ................. 176/78 |

*Primary Examiner*—Harvey E. Behrend

[57] ABSTRACT

In a boiling water reactor fuel assembly, which has vertical fuel rods and guide tubes positioned below the fuel rods and receiving control rod fingers and acting as water pipes, the guide tubes are each formed of a plurality of parts including a part secured to a grid plate positioned in the fuel assembly container, and low parts which fit into holes formed in the bottom of the fuel assembly. There is a flexible connection between the upper and lower parts of the guide tubes to allow for a certain tolerance in the procedure of manufacturing the various parts to allow insertion of the fuel rod bundle into the fuel assembly container.

3 Claims, 3 Drawing Figures

FUEL ASSEMBLY FOR A BOILING WATER REACTOR

BACKGROUND OF THE INVENTION

1. Field of the Invention

The present invention relates to a fuel assembly for a boiling water reactor comprising a plurality of fuel rods arranged on a bottom plate and a plurality of upper guide tube parts spaced vertically between them and intended for both control rod fingers and water tubes; said guide tube parts being secured to said bottom plate and passing through it.

More specifically, the invention relates to a fuel assembly in which a plurality of guide tubes, each intended for a control rod finger, extend from the upper edge of the reactor core to the bottom of the fuel assembly, where the lower ends of the guide tubes are fitted with very little clearance into individual, axial bores in the bottom of the fuel assembly.

2. The Prior Art

When using guide tubes of conventional type, the requirements of manufacturing accuracy would be unreasonably great if the directioning of the guide tubes leading out of the reactor core had to agree so exactly with the bores in the assembly bottom that the bottom part of the assembly and the part lying further up could be assembled without any difficulty. Poor accuracy in the manufacturing stage would result in poor economy since too much clearance between the bore in the bottom of the fuel assembly and the lower guide tube would result in unacceptable leakage flow.

SUMMARY OF THE INVENTION

The above drawback is avoided by means of the invention, which is characterised by the fact that the fuel assembly has a bottom plate and a bottom, the fuel rods being arranged on the bottom plate and guide tubes being provided which are located between the rods and formed of upper and lower parts, the upper parts being connected to the bottom plate and the lower parts fitting into openings in the bottom. The upper and lower parts of the guide tubes are connected by a flexible connection to allow for tolerance in the manufacturing process and to permit the entry of the lower parts of the guide tubes into the openings in the bottom.

BRIEF DESCRIPTION OF THE DRAWINGS

In the following, the invention will be further described with reference to the accompanying drawings in which.

DESCRIPTION OF THE PREFERRED EMBODIMENTS

Figure 1:
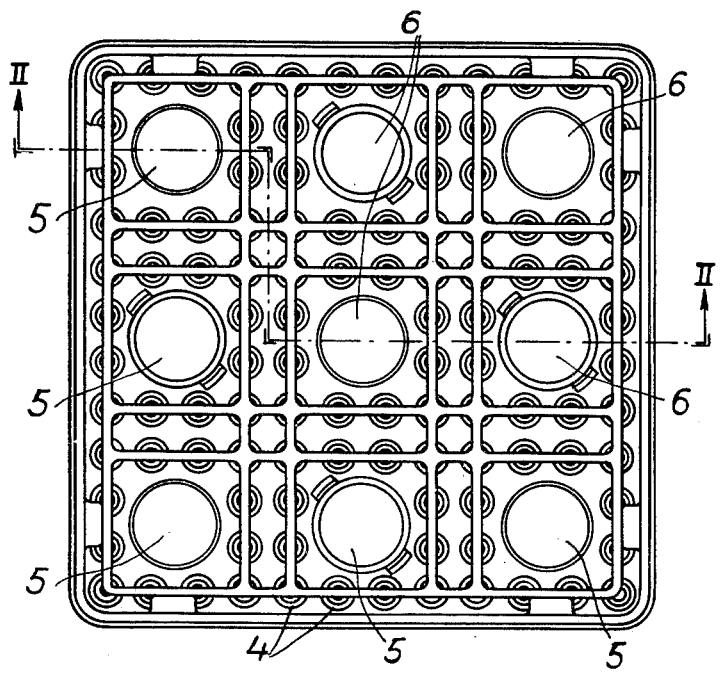
FIG. 1 shows a fuel assembly according to the invention, seen from above.

In the drawings 1 designates a top part, 2 a fuel rod bundle, 3 a bottom part and 18 a shroud tube of the fuel assembly. The fuel rod bundle 2 comprises a plurality of fuel rods 4 which, together with tubes 5 and 6 of relatively large diameter, are held together as a unit by means of spacers 7 and a bottom plate 8. The tubes 5 are guide tubes for the control rod fingers whereas the tubes 6 are only used as water tubes.

Each guide tube 5 has an upper guide tube part 9 and a lower guide tube part 10. The upper guide tube part 9 comprises a lead-in sleeve 11 mounted in the bottom plate 8 and a connection piece 12 rigidly joined to this sleeve, the connection piece 12 being designed to form a flexible connection with the lower guide tube part 10 which protrudes with its lower end in a sliding fit into a vertical bore 13 in the bottom part 3 of the fuel assembly. The entrances to these bores are bevelled as at 16 to guide the part 10 into the hole 13. The lower end of the guide tube part 9 is provided with a thicker pipe piece 11 which is in contact with the upper side of the bottom plate 8. The connection piece 12 is threaded on the lower end of the pipe piece 11 so that the bottom plate is clamped between parts 11 and 12. The object of the connection piece is primarily to clamp the guide tube to the bottom plate. A lining 14 is arranged lowermost in the bore for the control rod finger positions to guide a control rod finger which is to pass through. The connection pieces 12 are manufactured from a tube having an outer diameter which is slightly (about 2 mm) smaller than the inner diameter of the lower guide tube part 10. The two tubes are provided by rolling with spherical sections 17 and 15, respectively, the inside of one abutting against the outside of the other to form a ball joint.

Figure 3:
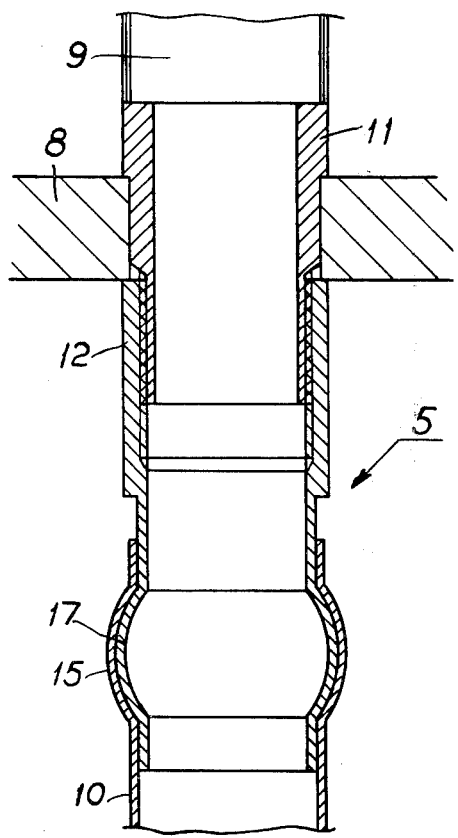
FIG. 3 shows a detail of FIG. 2.
Figure 2:
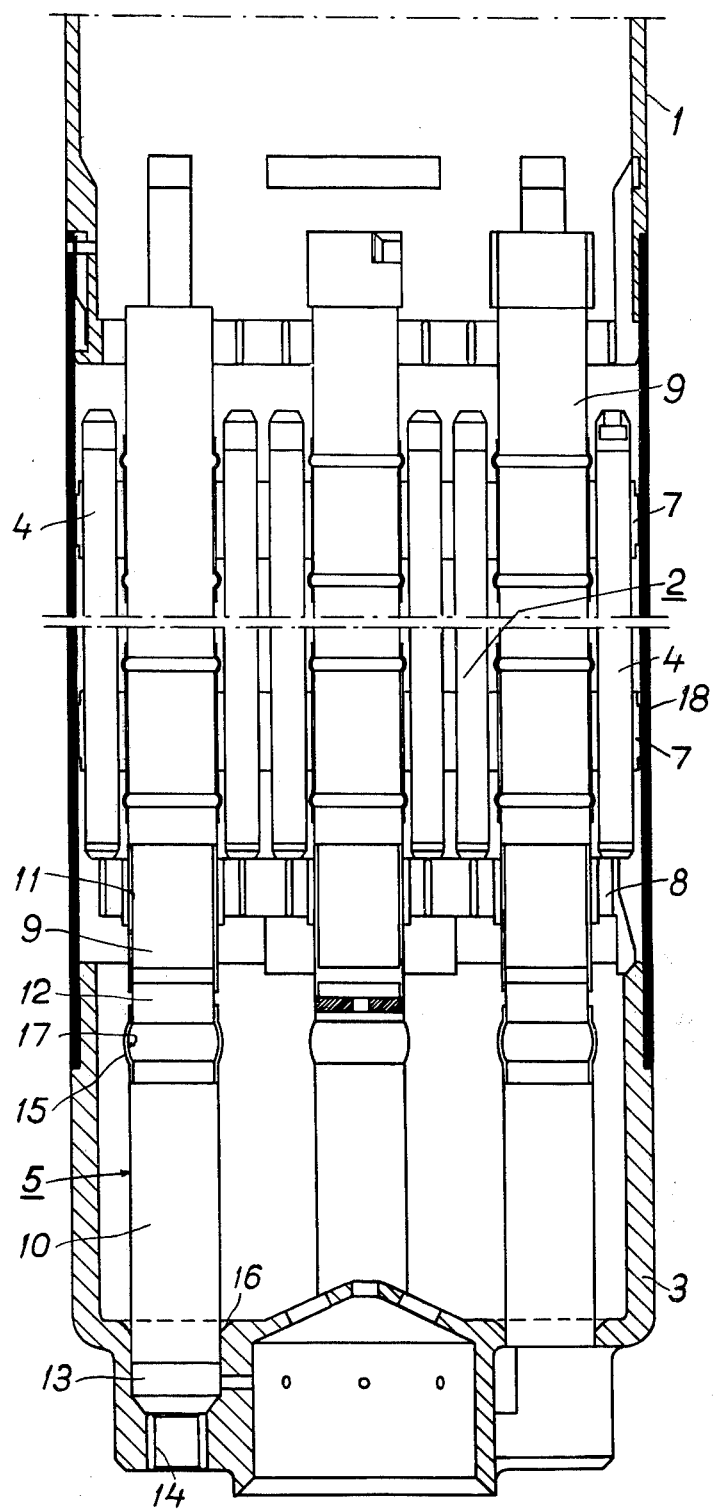
FIG. 2 shows the same fuel assembly in section along the line II—II in FIG. 1

The water tubes 6 also have the construction shown in FIG. 3. It is the attachment of the tubes 5 and 6 to the bottom plate which holds together, and to a great extent supports, the entire fuel assembly.

An important feature of a fuel assembly according to the invention is that the fuel rod bundle (fuel rods 4 plus guide tubes 5 plus spacer plus bottom plate) can be lifted out of the box (shroud tube 18 plus bottom part 3), for example for refuelling, when the detachable top part 1 has been dismantled. It is during insertion of the fuel rod bundle into the box that the jointed guide tube fulfils its function.

We claim:

1. Fuel assembly for a boiling water reactor, comprising a bottom plate (8) and a bottom part (3), a plurality of vertical fuel rods (4) arranged on said bottom plate, and a plurality of upper guide tube parts (9) located between the fuel rods and intended for both control rod fingers and to act as water tubes, said upper guide tube parts (9) being secured to said bottom plate and passing through it, said upper guide tube parts (9) having individual connection pieces (12) located below the bottom plate (8) and individual lower guide tube parts (10), the bottom part (3) having a plurality of holes (13) therein, said lower guide tube parts fitting without substantial clearance into said holes (13), and a flexible connection (15, 17) connecting each upper end of said lower guide tube parts to one of said connection pieces (12).

2. Fuel assembly according to claim 1, in which the upper ends of said holes are bevelled.

3. Fuel assembly according to claim 1, in which said flexible connections include spherically shaped end sections of said lower guide tube parts (10) interfitting with spherical surfaces on the connection pieces.

* * * * *